United States Patent
Gil et al.

(10) Patent No.: US 10,358,202 B2
(45) Date of Patent: Jul. 23, 2019

(54) ELECTRIC MARINE PROPULSION SYSTEMS WITH DRIVE TRAINS, AND ASSOCIATED SYSTEMS AND METHODS

(71) Applicant: Pure Watercraft, Inc., Seattle, WA (US)

(72) Inventors: Christopher Mario Gil, Federal Way, WA (US); Andrew G. Milburn, Vaughn, WA (US)

(73) Assignee: Pure Watercraft, Inc., Seattle, WA (US)

( * ) Notice: Subject to any disclaimer, the term of this patent is extended or adjusted under 35 U.S.C. 154(b) by 0 days.

(21) Appl. No.: 15/665,281

(22) Filed: Jul. 31, 2017

(65) Prior Publication Data

US 2018/0029681 A1    Feb. 1, 2018

Related U.S. Application Data (60) Provisional application No. 62/369,376, filed on Aug. 1, 2016.

(51) Int. Cl.
*B63H 20/14*  (2006.01)
*F16H 1/28*  (2006.01)
(Continued)

(52) U.S. Cl.
CPC ........... *B63H 20/14* (2013.01); *F16H 57/023* (2013.01); *F16H 57/08* (2013.01);
(Continued)

(58) Field of Classification Search
CPC ........ B63H 20/00; B63H 20/14; B63H 20/32; B63H 23/00; B63H 23/06; B63H 23/24; B63H 21/00; B63H 21/30; B63H 21/383; F16H 1/28; F16H 57/023; F16H 57/029; F16H 57/08
(Continued)

(56) References Cited

U.S. PATENT DOCUMENTS 3,841,396 A    10/1974 Knaebel et al.
4,009,677 A *   3/1977 Croisant ............... B63H 20/007
                                                440/6
(Continued)

FOREIGN PATENT DOCUMENTS

DE    102013218674    3/2015
EP        2372828    10/2011
(Continued)

OTHER PUBLICATIONS

"Compound Planetary Gear," Planetary Gear Train with Stepped Planet Gear Set—MATLAB, http://www.mathworks.com, accessed Aug. 25, 2017, 3 pages.
(Continued)

*Primary Examiner* — Lars A Olson
(74) *Attorney, Agent, or Firm* — Perkins Coie LLP (57) ABSTRACT

The present technology is directed generally to electric marine propulsion systems with drive trains, and associated systems and methods. In representative embodiments, the disclosed technology includes pre-assembled transmission cartridges, gear reduction planetary gears, and/or component support arrangements that can increase the life of the system and/or reduce manufacturing costs.

36 Claims, 9 Drawing Sheets

(51) Int. Cl.
*F16H 57/02* (2012.01)
*F16H 57/08* (2006.01)
*F16H 57/023* (2012.01)
*F16H 57/029* (2012.01)

(52) U.S. Cl.
CPC ............ *B63B 2755/00* (2013.01); *F16H 1/28* (2013.01); *F16H 57/029* (2013.01); *F16H 2057/02034* (2013.01)

(58) Field of Classification Search
USPC .................................. 440/6; 310/83, 87, 90
See application file for complete search history.

(56) References Cited

U.S. PATENT DOCUMENTS

| | | | |
|---|---|---|---|
| 4,092,946 | A | 6/1978 | Kappas |
| 4,099,478 | A * | 7/1978 | Alexander, Jr. ...... B63H 20/007 440/6 |
| 4,305,012 | A | 12/1981 | Friedel |
| 4,568,289 | A | 2/1986 | Heidrich et al. |
| 5,296,797 | A | 3/1994 | Bartlett |
| 5,445,545 | A | 8/1995 | Draper |
| 5,571,023 | A | 11/1996 | Anthony |
| 5,588,853 | A | 12/1996 | Anthony |
| D378,292 | S | 3/1997 | Yoshioka |
| 5,967,863 | A | 10/1999 | Marchant |
| 6,231,407 | B1 | 5/2001 | Hein et al. |
| 6,865,280 | B2 | 3/2005 | Lin |
| D523,812 | S | 6/2006 | Brodin |
| 7,270,074 | B2 * | 9/2007 | Pradetto ................. B63C 11/46 440/6 |
| D649,938 | S | 12/2011 | Erickson et al. |
| D649,939 | S | 12/2011 | Erickson et al. |
| 8,658,299 | B2 | 2/2014 | Yang et al. |
| 2004/0130292 | A1 | 7/2004 | Buchanan et al. |
| 2005/0275372 | A1 | 12/2005 | Crowell |
| 2008/0268333 | A1 | 10/2008 | Barrella et al. |
| 2010/0248562 | A1 | 9/2010 | Daikoku |
| 2011/0263165 | A1 | 10/2011 | Rolla |
| 2011/0291611 | A1 | 12/2011 | Manor |
| 2012/0074901 | A1 | 3/2012 | Mohammed |
| 2012/0153899 | A1 | 6/2012 | Marschalkowski et al. |
| 2012/0282497 | A1 | 11/2012 | Yang et al. |
| 2012/0282825 | A1 | 11/2012 | Lin |
| 2013/0049677 | A1 | 2/2013 | Bouman |
| 2013/0078839 | A1 | 3/2013 | Musk et al. |
| 2013/0229072 | A1 | 9/2013 | Matsuda |
| 2014/0187107 | A1 | 7/2014 | Gemin et al. |
| 2015/0017841 | A1 | 1/2015 | Chen |
| 2015/0077040 | A1 | 3/2015 | Longdon et al. |
| 2015/0130421 | A1 | 5/2015 | Bevilacqua, III |
| 2015/0357692 | A1 | 12/2015 | Piggott et al. |
| 2015/0372279 | A1 | 12/2015 | Li |
| 2016/0111831 | A1 | 4/2016 | Kawai et al. |
| 2016/0114692 | A1 | 4/2016 | Tripathi et al. |
| 2016/0248192 | A1 | 8/2016 | Hamada |
| 2018/0019535 | A1 | 1/2018 | Uenosono et al. |
| 2018/0048091 | A1 | 2/2018 | Kawai et al. |

FOREIGN PATENT DOCUMENTS

| | | |
|---|---|---|
| JP | 2005162055 | 6/2005 |
| WO | WO-2014021841 | 2/2014 |

OTHER PUBLICATIONS

International Search Report and Written Opinion for International Patent Application No. PCT/US2017/044759, Applicant: Pure Watercraft, Inc., dated Oct. 12, 2017, 8 pages.

Nitrofreeze "Shrink Fitting," https://web.archive.org/web/20160724183319/http://nitrofreeze.com/services/custom-cryogenic-processing/shrink-fitting/, Jul. 24, 2016, 3 pages.

* cited by examiner

FIG. 5E

ELECTRIC MARINE PROPULSION SYSTEMS WITH DRIVE TRAINS, AND ASSOCIATED SYSTEMS AND METHODS

CROSS-REFERENCE TO RELATED APPLICATION

The present application claims priority to U.S. Provisional Application No. 62/369,376, filed on Aug. 1, 2016 and incorporated herein by reference.

TECHNICAL FIELD

The present disclosure is directed generally to electric marine propulsion systems with drive trains, and associated systems and methods. In some embodiments, the drive train can be manufactured as a compact, self-contained unit, and can include features to enhance the concentricity of elements in the drive train.

BACKGROUND

Outboard motors have been used for many years to propel smaller boats and other watercraft. Conventional outboard motors typically include a two-stroke or four-stroke internal combustion engine. More recently, in response to consumer demand for quieter and more environmentally friendly outboard motors, manufacturers have begun producing electric outboard motors.

One challenge associated with optimizing the efficiency and power density of electric outboard motors is that such motors require a significant gear reduction between the electric motor itself and the propeller to which it is coupled. Accordingly, it can be difficult to provide a suitable gear-reduction drive train that is compact, reliable and long-lasting, while also being relatively simple to manufacture and service.

DETAILED DESCRIPTION

The present technology is directed generally to electric marine propulsion systems with drive trains, and associated systems and methods. In some embodiments, the drive trains include a planetary gear arrangement with one or more of several features, including planetary gears on a common shaft that provide further gear reduction, a bearing that supports a planetary gear carrier relative to an output shaft, and/or a cartridge configuration that allows the transmission to be easily installed and removed from a corresponding outboard motor.

Specific details of several embodiments of the present technology are described below with reference to particular motor configurations to provide a thorough understanding of the relevant components. In other embodiments, the technology can be applied to electric motors having other configurations. Several details describing structures and/or processes that are well-known and often associated with outboard motors and/or electric motors, but that may unnecessarily obscure some significant aspects of the present technology, are not set forth in the following description for purposes of clarity. Moreover, although the following disclosure sets forth several embodiments of different aspects of the present technology, several other embodiments of the technology have different configurations or different components than those described in this section. As such, the present technology may have other embodiments, with additional elements and/or without several of the elements described below with reference to FIGS. 1-5E.

Figure 1:
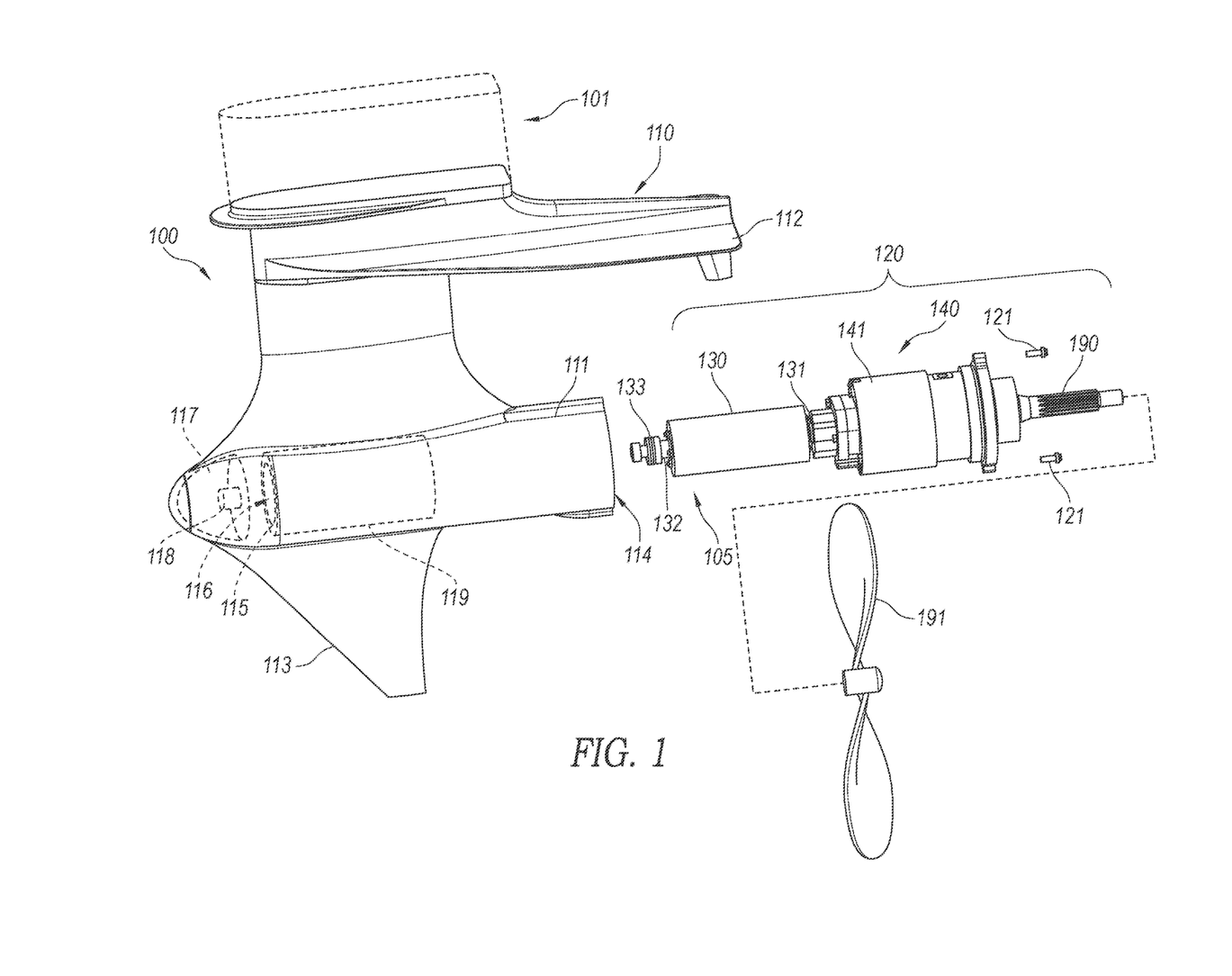
FIG. 1 is a partially schematic, partially exploded illustration of a propulsion system for an outboard motor, configured in accordance with embodiments of the present technology.

FIG. 1 is a partially schematic illustration of a propulsion system 100 carried by an outboard motor 101 in accordance with some embodiments of the present technology. The propulsion system 100 includes an electric motor 105 that drives a propeller 191. The propulsion system 100 can be housed in a lower unit 110 of the outboard motor 101 which extends below the waterline when in use. The lower unit 110 can include a lower unit housing 111 that carries the propulsion system 100, and can further include other features typical of an outboard motor, for example, an anti-ventilation plate 112 (which prevents surface air from being ingested by the propeller 191), and a skeg 113 (which prevents damage to the propeller 191 if the outboard motor 101 strikes an object).

The lower unit housing 111 includes a propulsion system aperture 114 that receives the electric motor 105. Accordingly, the propulsion system aperture 114 can house a stator 115, and can removably house a cartridge 120 that includes a corresponding rotor 130, rotor drive shaft 131, transmission 140, and output shaft 190. The output shaft 190 drives the propeller 191, and the transmission 140 provides the gear reduction between the rapidly rotating, lower torque rotor 130 and the more slowly rotating, higher torque output shaft 190 and propeller 191.

In some embodiments, the stator 115 is shrink-fit into the propulsion system aperture 114 to secure it in place. In a representative process, the lower unit housing 111 is heated to expand the diameter of the propulsion system aperture 114. The stator 115 is then inserted into the propulsion system aperture 114 while the lower unit housing is at the elevated temperature, and the lower unit housing 111 is then cooled to shrink it around the stator 115, forming a shrink-fit interface 119. In some embodiments, the stator 115 is cooled, in addition to or in lieu of heating the lower unit housing 111. More generally, the process can include causing or increasing a temperature difference between the lower unit housing 111 and the stator 115, inserting the stator 115, and causing the temperature difference to decrease.

The foregoing approach can provide one or more of several advantages. For example, the shrink fit connection is expected to be very tight, reducing or eliminating the likelihood for the stator 115 to loosen within the lower unit housing 111. In some embodiments, the shrink-fit connection is the only connection between the stator 115 and the lower unit housing 111, eliminating the need for fasteners to separately secure the stator 115 to the lower unit housing 111. This in turn can reduce the time required to secure the stator 115 in place, and can further reduce the likelihood for the stator 115 to loosen. Another expected advantage of the shrink-fit connection is that it is expected to place the stator 115 in very close thermal communication with the lower unit housing 111. Since the stator 115 carries electrical current and generates heat during the operation of the electric motor 105, the enhanced thermal communication can increase the rate at which the heat is conveyed away from the electric motor 105 via thermal conduction to the lower unit housing 111, and via thermal conduction and convection to the surrounding water. This in turn can eliminate the need for an active cooling system (e.g., an internal cooling liquid loop or a once-through seawater cooling system), while providing sufficient heat transfer to allow the electric motor 105 to last for many years. To further enhance the thermal communication between the stator 115 and the lower unit housing 111, the foregoing process can include coating the stator 115 with a suitable thermally conductive paste or other compound before inserting the stator 115 into the propulsion system aperture 114.

The lower unit housing 111 can further include an end piece 117 having a bearing aperture 118 that receives and supports a corresponding support shaft bearing 133 of the cartridge 120. The end piece 117 can be formed integrally with the lower unit housing 111, or manufactured separately and then installed in the lower unit housing, e.g., as part of the shrink-fit process for the stator 115 (described above) or via one or more fasteners, prior to the shrink-fit process. During assembly, the cartridge 120 can be inserted, as a unit, into the propulsion system aperture 114, with the support shaft bearing 133 received in the bearing aperture 118, and with the rotor 130 positioned in a rotor opening 116 of the stator 115. The cartridge 120 can be attached to the lower unit housing 111 with only one or only two mechanical fasteners 121. For purposes of illustration, two threaded mechanical fasteners 121 are shown in FIG. 1. In some embodiments, other types of arrangements are used (e.g., a tab and slot on one side, and a threaded fastener on the other), which may result in corresponding adjustments to the seal between the cartridge 120 and the lower unit housing 111. In any of these embodiments, an advantage of this arrangement is that since only one or two mechanical fasteners are necessary to secure the cartridge 120 in place, the cartridge 120 can be easily installed, and can be easily removed later for servicing, if necessary. This in turn allows the components of the cartridge 120 to be assembled and lubricated outside the lower unit housing 111, rather than being inserted one-by-one into the lower unit housing 111. By assembling the components outside the lower unit housing 111 before installing the cartridge 120 as a unit, the manufacturer can more easily ensure that the components are properly connected and aligned. This in turn can reduce the need to remove components one-by-one from the lower unit housing 111 if the initial piece-by-piece installation is not properly performed. This process also allows the cartridge 120 to be functionally tested in a test fixture prior to installation, for example at the cartridge manufacturer, which shortens production time and lowers the risk associated with final assembly of the outboard motor.

As described above, the cartridge 120 includes the rotor 130, the transmission 140, and the output shaft 190. The rotor 130 includes the drive shaft 131 which is coupled to the transmission 140, and a support shaft 132, which extends in the opposite direction. The support shaft 132 can provide additional support for the rotor 130 via the support shaft bearing 133 so that the rotor 130 is not cantilevered within the propulsion system aperture 114. The transmission 140 includes a transmission housing 141 in which the associated gear-reduction components are housed. Further details of the cartridge 120 and the transmission 140 are described below with reference to FIGS. 2-5E.

Figure 2:
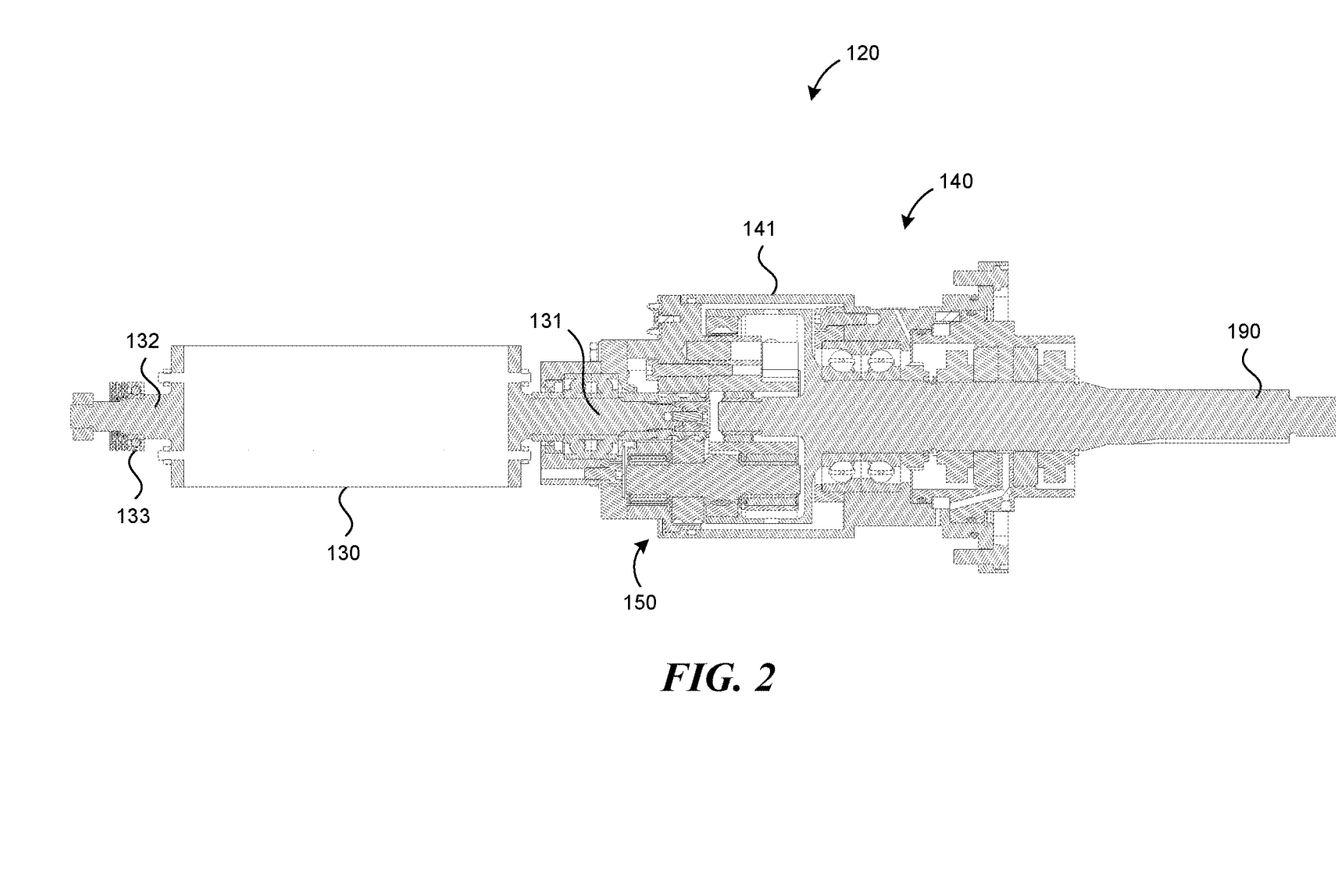
FIG. 2 is a partially schematic, cross-sectional illustration of a portion of the propulsion system shown in FIG. 1, configured in accordance with embodiments of the present technology.

FIG. 2 is a partially schematic, cross-sectional illustration of the cartridge 120, illustrating the rotor 130 with its associated support shaft 132 and drive shaft 131. The drive shaft 131 extends into the transmission housing 141 where it is coupled to the output shaft 190 via a planetary gear assembly 150. Further details of the planetary gear assembly 150 and other elements of the transmission 140 are described below with reference to FIG. 3.

Figure 3:
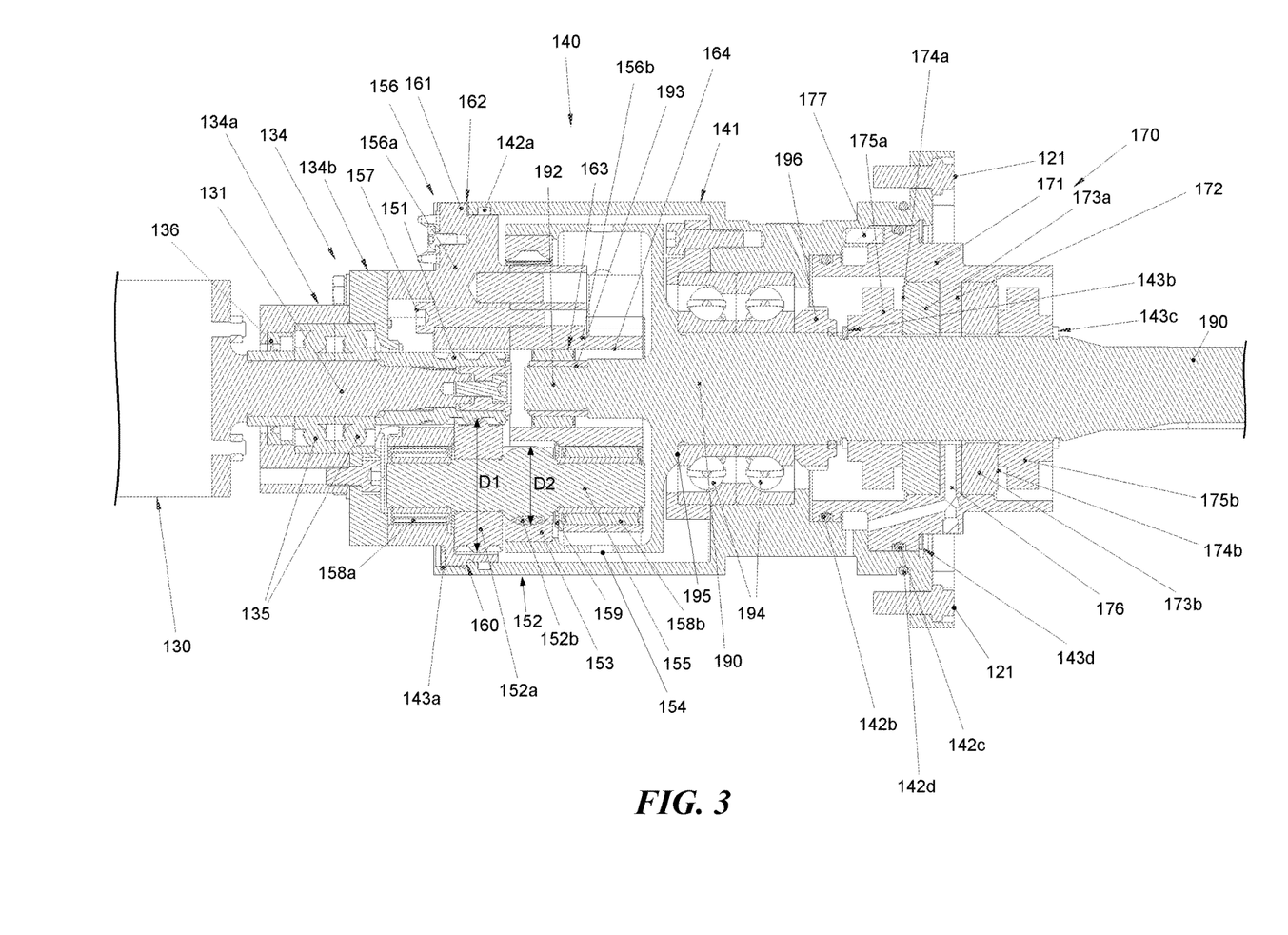
FIG. 3 is an enlarged, cross-sectional illustration of a portion of the propulsion system shown in FIG. 2.

FIG. 3 is an enlarged view of a portion of the representative system shown in FIG. 2, illustrating further details of the transmission 140 and associated components. The transmission 140 can include a sun gear 151 carried by the drive shaft 131. The sun gear engages with multiple planetary gears 152 carried by a planetary gear carrier 156. The planetary gear carrier 156 is fixed relative to the transmission housing 141. The associated planetary gears 152 also engage with a ring gear 153 carried by a ring gear support 154 that is in turn connected to the output shaft 190. When the drive shaft 131 rotates, the sun gear 151 rotates the planetary gears 152, which in turn rotate the ring gear 153 to drive the output shaft 190 at a slower angular rate.

The planetary gear carrier 156 can include a first portion 156a connected to a second portion 156b, e.g., with one or more carrier fasteners 157. A first O-ring 142a seals the planetary gear carrier 156 to the transmission housing 141. The planetary gear carrier 156 supports multiple planetary gear shafts 155, one of which is visible in FIG. 3. Each planetary gear shaft 155 can carry at least one planetary gear 152 that meshes with the ring gear 153. In some embodiments, as illustrated in FIG. 3, each planetary gear shaft 155 carries two planetary gears: a first planetary gear 152a that meshes with the sun gear 151, and a second, smaller planetary gear 152b that meshes with the ring gear 153. This arrangement can provide a further gear reduction and associated speed reduction, in addition to the gear reduction provided by the ring gear 153. In a particular embodiment, the first planetary gear 152a has a first diameter D1 and the second planetary gear 152b has a second, smaller diameter D2. The ratio of the diameters determines the gear reduction provided by these two gears.

The associated planetary gear shaft 155 rotates relative to the planetary gear carrier 156, and is supported for rotation via a first planetary shaft bearing 158a and a second planetary shaft bearing 158b. The two planetary shaft bearings 158a, 158b are placed on opposite sides of the corresponding planetary gears 152 so that the planetary gear shaft 155 is not cantilevered, but is instead supported at or near both ends. This arrangement further stabilizes the planetary gear shaft 155, which reduces wear and/or increases the longevity of the system.

As will be described in further detail below with reference to FIG. 4, the teeth of the first and second planetary gears 152a, 152b can be selected to counteract thrust loads provided by each gear, resulting in a net thrust load reduction. In some embodiments, the system can nevertheless include a thrust washer 159 to account for residual thrust loads.

The planetary gear carrier 156 can be fixed relative to the transmission housing 141 in an axial direction via a first retaining ring 143a that biases the planetary gear carrier 156 against a carrier shoulder 160. The planetary gear carrier 156 can be fixed from rotating relative to the transmission housing 141 via a key 161 that is received in a corresponding key way 162 of the transmission housing 141. Accordingly, the planetary gear carrier 156 is secured relative to the transmission housing 141, but in the event service is required, can be easily removed by removing the first retaining ring 143a. As will be described further below, the overall assembly can include multiple retaining rings 143, which can similarly make assembly and disassembly of other system components a more efficient operation.

The system shown in FIG. 3 can include features to enhance or ensure the concentricity of the output shaft 190 relative to the drive shaft 131 and the planetary gear carrier 156. For example, the output shaft 190 can include an extension portion 192 that extends axially within the ring gear support 154 toward the drive shaft 131 and the planetary gear carrier 156. The transmission 140 can include a carrier bearing 163, positioned between an inwardly facing surface 164 of the planetary gear carrier 156, and an outwardly facing surface 193 of the extension portion 192. The additional support provided by the carrier bearing 163, and its position directly between the output shaft 190 and the planetary gear carrier 156, can reduce or eliminate the presence of cantilever loads, which might otherwise be associated with the axially extending ring gear support 154, and which can create additional wear on the system.

In some embodiments, the output shaft 190 can be further supported by output shaft bearings 194 positioned on the opposite side of the ring gear support 154 from the carrier bearing 163. The output shaft bearings 194 are secured in place via a locknut 196 that biases the bearings against a shaft shoulder 195.

Because the transmission housing 141 is positioned underwater during operation, the system can include an output shaft seal 170 that prevents water from entering the transmission 140. The output shaft seal 170 can include a seal housing 171 having a seal support 172 that positions multiple seals relative to the output shaft 190. The multiple seals can include a first static face seal 173a on one side of the seal support 172, and a second static face seal 173b on the opposite side of the seal support 172. The static face seals 173a, 173b engage with corresponding rotating face seals 175a, 175b at corresponding sealing surfaces 174a, 174b. The stacked face seals are secured in position via a second retaining ring 143b and a corresponding third retaining ring 143c positioned in corresponding grooves of the output shaft 190. The output shaft seal 170 can further include second and third O-rings 142b, 142c to seal the interfaces between the seal housing 171 and the transmission housing 141. A fourth O-ring, 142d seals the interface between the cartridge 120 and the lower unit housing 111 (FIG. 1). A vent path 176 allows air to vent outwardly from the seal housing 171, and a fourth retaining ring 143d secures the seal housing 171 to the transmission housing 141. A pin 177 prevents the seal housing 171 from rotating relative to the transmission housing 141.

At the opposite end of the transmission 140, the rotor drive shaft 131 is also supported for rotation with multiple bearings, and sealed. Accordingly, the system can include a rotor bearing housing 134 having a first portion 134a and a second portion 134b that together enclose one or more rotor bearings 135 (two are shown in FIG. 3 for purposes of illustration). The rotor bearing housing portions 134a, 134b can be connected via one or more fasteners. The rotor bearing housing 134 also carries a seal 136 positioned around the drive shaft 131. The seal 136 can prevent internal lubricant from leaking into the propulsion system aperture 114 (FIG. 1), which is separately sealed by the fourth O-ring 142d and the mechanical fasteners 121 from the external marine environment.

Figure 4:
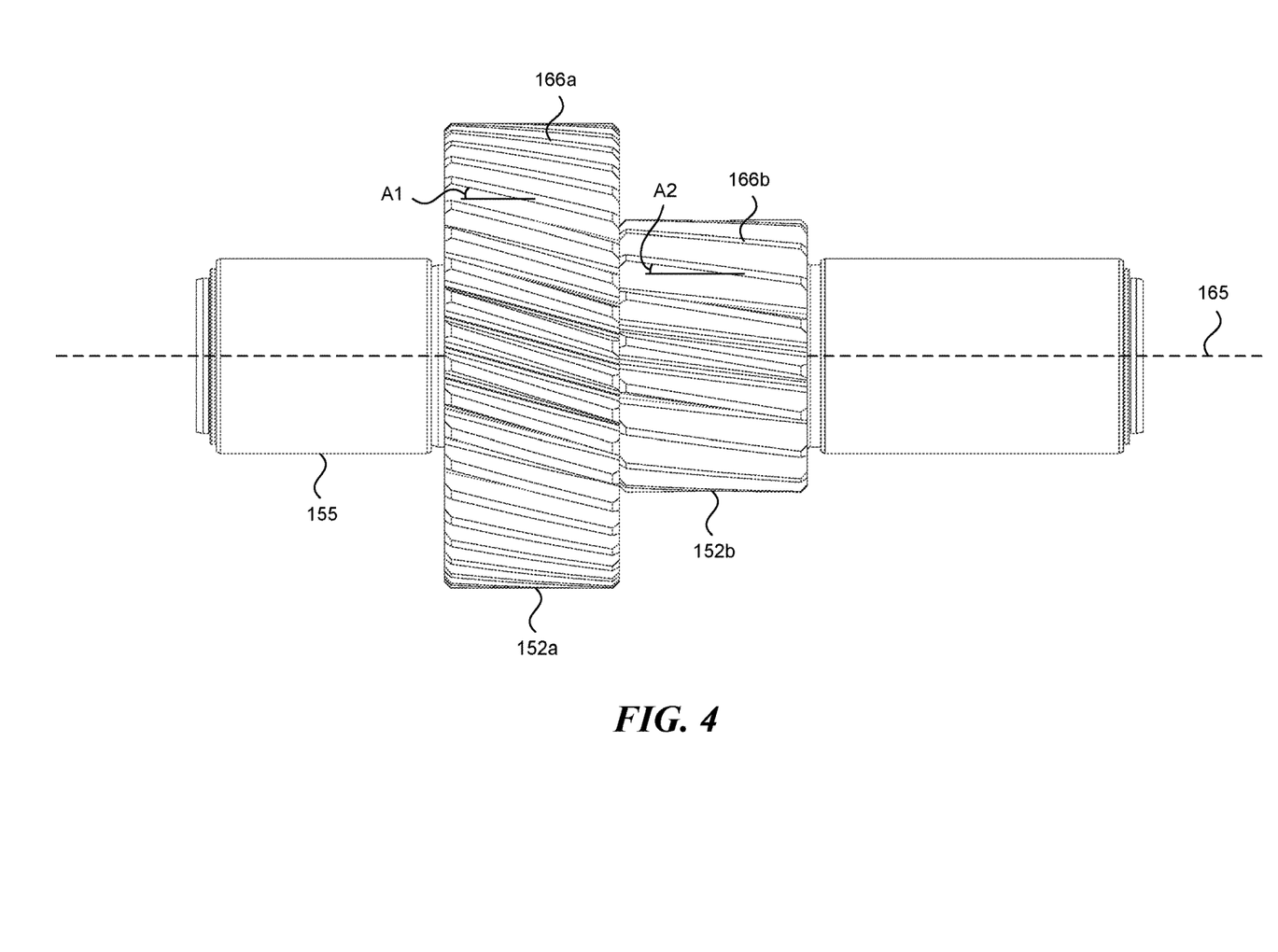
FIG. 4 is a partially schematic side view of a planetary gear shaft carrying two planetary gears, in accordance with embodiments of the present technology.

FIG. 4 is a schematic illustration of one of the planetary gear shafts 155 and associated first and second planetary gears 152a, 152b. Each of the planetary gears 152a, 152b can include corresponding helical teeth 166a, 166b. The first helical teeth 166a can be inclined relative to a shaft axis 165 of the planetary gear shaft 155 by a first tooth angle A1. The second helical teeth 166b can be inclined relative to the shaft axis 165 by a second tooth angle A2. The first and second tooth angles A1, A2 can be selected to be different than each other to reduce or eliminate the relative thrust loads generated by the planetary gears 152a, 152b during operation. Because the first planetary gear 152a engages the inwardly positioned sun gear, and the second planetary gear 152b engages the outwardly positioned ring gear, the first and second angles A1, A2 can have the same sense or direction (e.g., unlike a "herring bone" arrangement), but as described above, can have different values to counteract thrust loads.

As described above, one feature of at least some of the foregoing embodiments is that they can include multiple, coaxial planetary gears that provide for a further gear reduction in a compact manner. Another feature of at least some of the foregoing embodiments is that the planetary gear shaft can be supported toward both ends to reduce loads and/or wear that may otherwise result from a cantilevered shaft. Still another feature of at least some of the foregoing embodiments is that the output shaft can also be supported at multiple locations, e.g., via the extension portion and associated carrier bearing, to improve concentricity and/or reduce loads and/or wear on the transmission components. Each of the foregoing features, individually and/or together in any suitable combination, can improve the reliability and life expectancy of the system.

As was also described above, the transmission, the drive shaft, and the output shaft can all be assembled and lubricated outside the lower housing of the outboard motor to form a cartridge that can easily be installed and removed with one or at most two fasteners. This arrangement can further improve the reliability and longevity of the system.

Another feature of at least some embodiments is that the transmission housing and lower unit housing include redundant seals. Accordingly, this arrangement can reduce the likelihood for water to leak into the transmission, and/or for lubricant to leak out.

In some embodiments, the transmission 140 can produce a gear reduction in the range of 4:1 to 10:1, for example, 7.83:1. This range of values is significantly higher than the gear reduction associated with typical internal combustion outboard engines, which generally range from 2:1 to 2.5:1. Accordingly, the ability of some or all of the foregoing features to provide a compact, precise transmission unit, despite the larger gear reduction ratio, can have particular applicability and benefits for electric outboard motors.

Figure 5A:
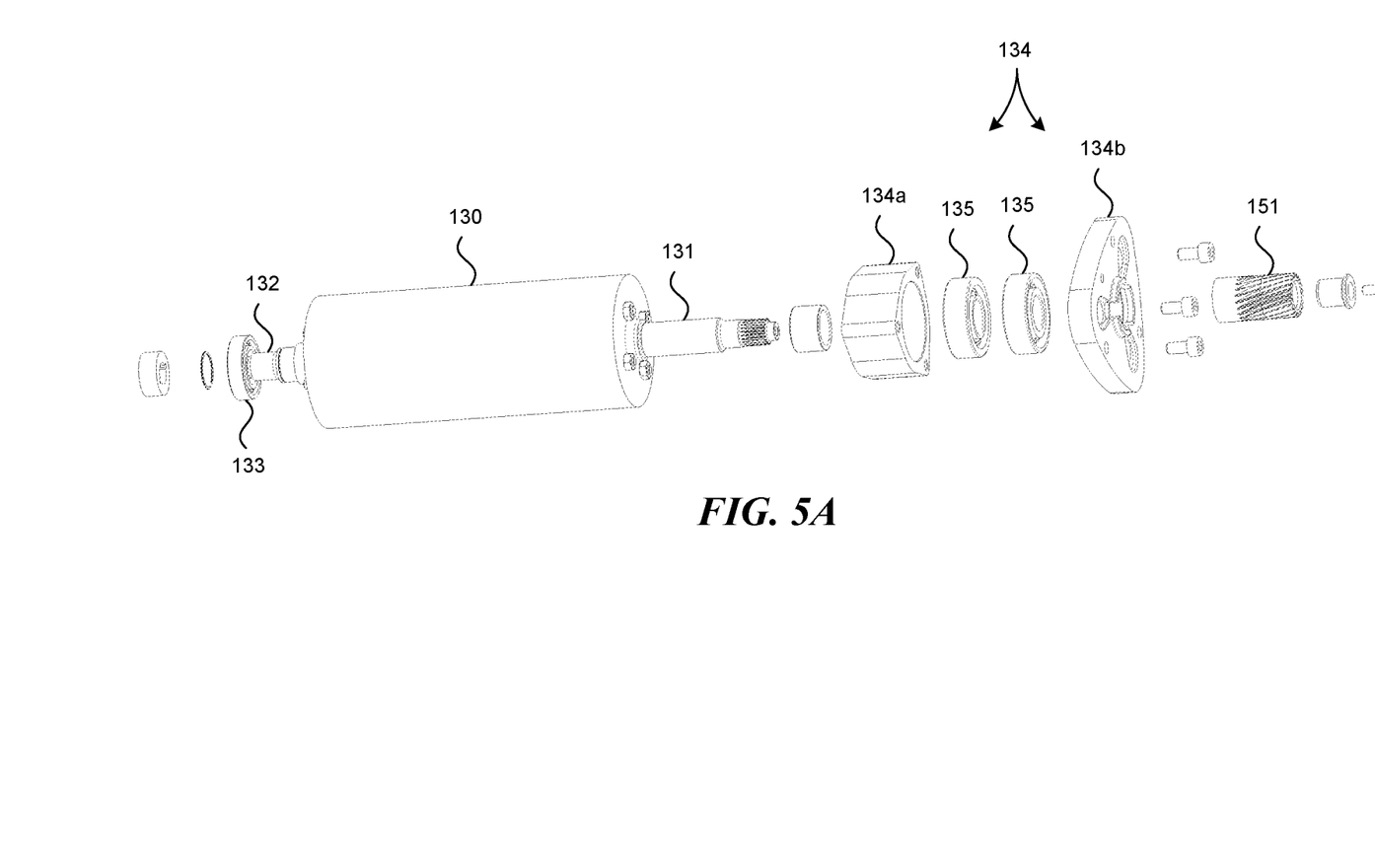
FIGS. 5A-5E illustrate exploded views and partial assemblies of representative components configured in accordance with embodiments of the present technology.

FIGS. 5A-5E illustrate exploded views and partial assemblies of selected components described above with reference FIGS. 1-4. For example, FIG. 5A illustrates the rotor 130, rotor shaft 131, support shaft 132, and support shaft bearing 133. The sun gear 151 is mounted to the drive shaft 131, which extends into the rotor bearing housing 134 (formed by the first and second portions 134a, 134b. The drive shaft 131 is supported by the rotor bearings 135.

Figure 5B:
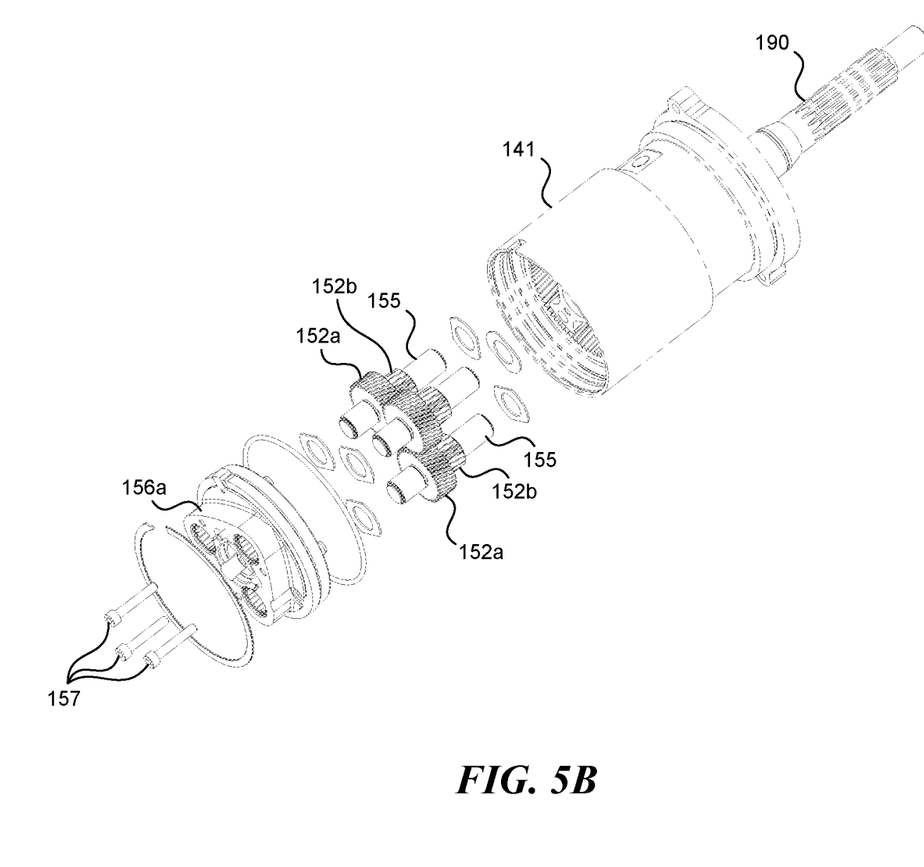

FIG. 5B illustrates the first portion 156a of the planetary gear carrier. FIG. 5B also illustrates the planetary gear shafts 155 carrying the first planetary gears 152a and the second planetary gears 152b, and corresponding carrier fasteners 157 that connect the first portion 156a to the second portion (not visible in FIGS. 5B). The planetary gears 152 are carried in the transmission housing 141, from which the output shaft 190 extends.

Figure 5C:
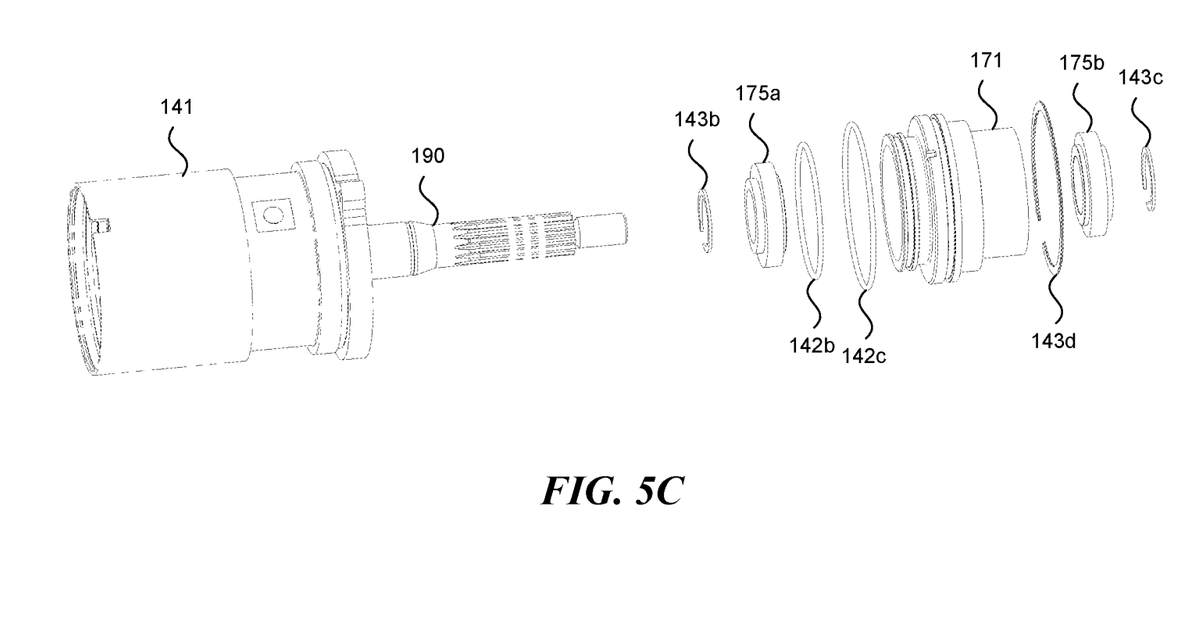

FIG. 5C illustrates selected components of the seal housing 171 that seal the output shaft 190. For example, FIG. 5C illustrates the first and second rotating face seals 175a, 175b, and the corresponding retaining rings 143b, 143c. FIG. 5C also illustrates the fourth retaining ring 143d, which secures the seal housing 171 to the transmission housing 141, and the second and third O-rings 142b, 142c that seal the resulting interface.

Figure 5D:
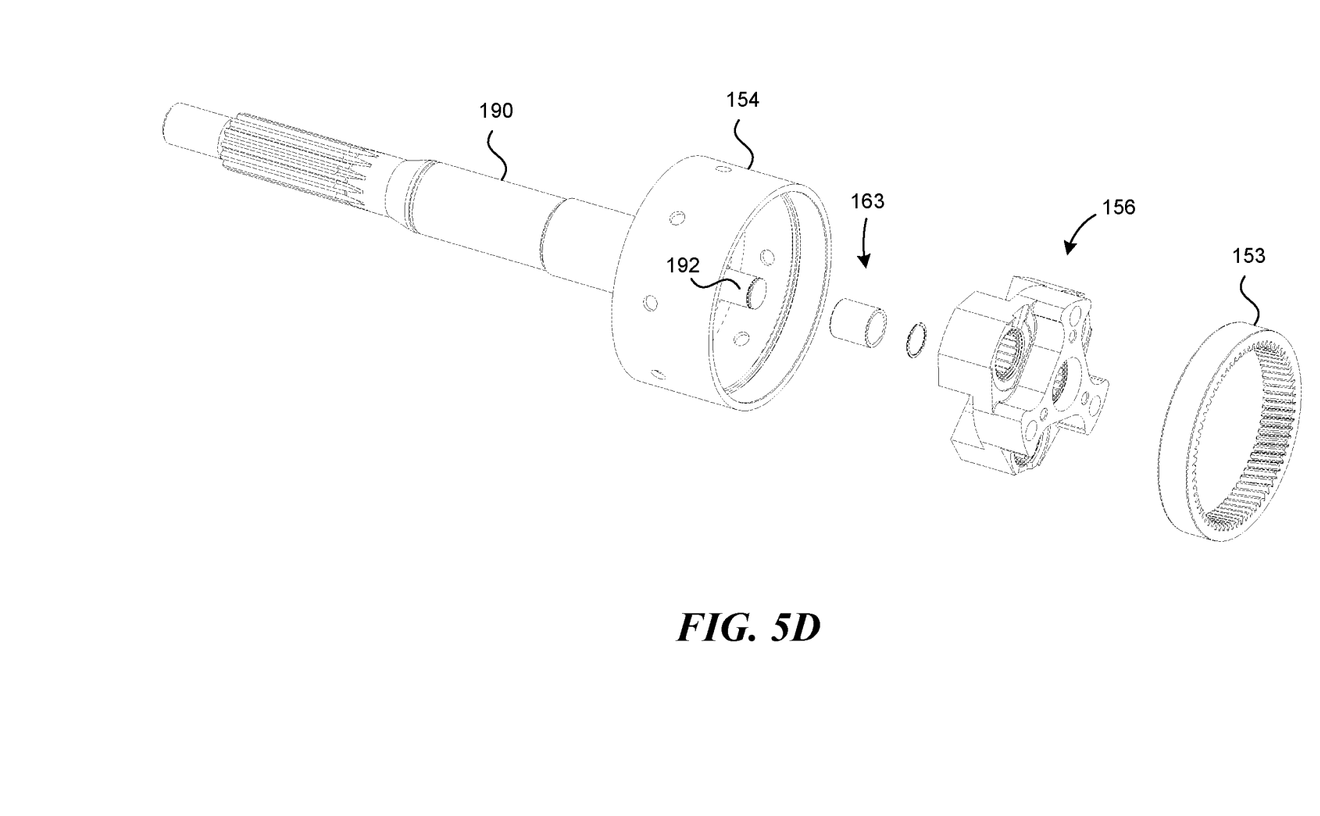

FIG. 5D illustrates the drive shaft 190 and the ring gear support 154. The ring gear 153 fits into the open end of the ring gear support 154, and the planetary gear carrier 156 fits within the ring gear 153. The carrier bearing 163 (of which the inner race is shown in FIG. 5D) provides a centering support between the planetary gear carrier 156 and the extension portion 192 of the output shaft 190.

Figure 5E:
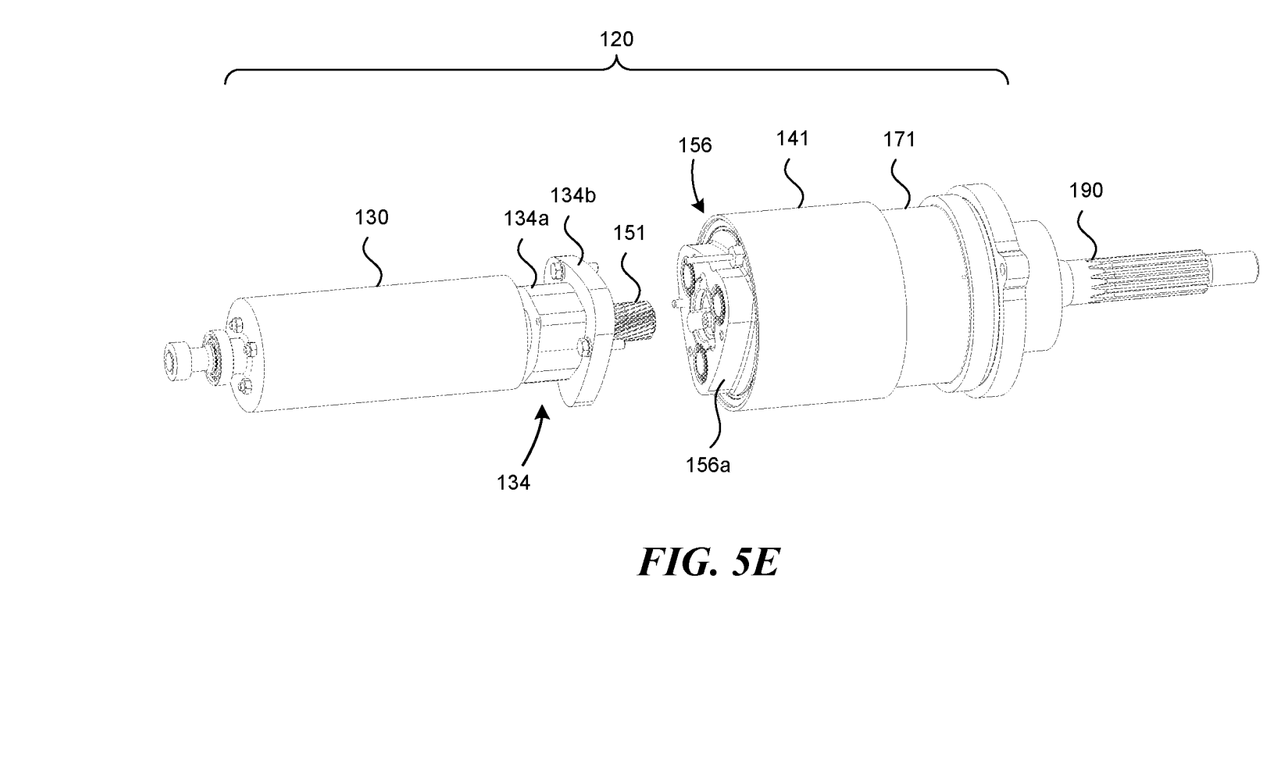

FIG. 5E illustrates the transmission housing 141 with internal components (including the output shaft 190 and components of the seal housing 171) installed. The first portion 156a of the carrier assembly 156 is exposed so as to be connected to the second portion 134b of the rotor bearing housing 134, which is connected to the rotor 130. Once this connection is made, the resulting cartridge 120 can be installed in the lower unit housing 111 described above with reference to FIG. 1.

From the foregoing, it will be appreciated that specific embodiments of the technology have been described herein for purposes of illustration, but that various modifications may be made without deviating from the technology. For example, in at least some embodiments, the transmission can include a single planetary gear on each planetary gear shaft, rather than multiple gears, for example, in cases for which the additional gear reduction associated with multiple gears on a single shaft is not necessary or desired. Bearings which are shown as roller bearings in the Figures, can have other configurations in other embodiments. The mechanical fasteners shown in the Figures as threaded screw-type fasteners, can have other configurations in other embodiments (e.g., clip or quick-release configurations). In some embodiments, the motor can have a horsepower rating of about 40 HP (or the equivalent), and can have other values depending upon the application. In some embodiments, the system can include only one or two fasteners to secure the cartridge to the lower unit, for example, two threaded fasteners, as shown in FIG. 1, or a retaining ring in combination with a pin (to prevent the cartridge from rotating). Other components can be connected with a small number of fasteners, in addition to or in lieu of the cartridge/lower unit fasteners. For example, the system can use only three fasteners to secure the rotor bearing housing to the transmission. In some embodiments, the planetary gear arrangement can include a fixed ring gear and a planetary gear carrier that is carried by the (rotating) output shaft.

Certain aspects of the technology described in the context of particular embodiments may be combined or eliminated in other embodiments. For example, in some embodiments, any of at least some features (e.g., the carrier bearing, multiple planetary gears on a single shaft, shrink-fit rotors installation, transmission cartridge, and/or reduced number mechanical fasteners), can be combined with any one or more of the foregoing features. In some embodiments, any one or more of the foregoing features can be applied in the context of a motor other than an outboard motor. For example, the removable cartridge can be applied in the context of other transportation platforms, industrial machinery and/or consumer products (e.g., a portable drill) in some embodiments. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

To the extent any materials incorporated herein by reference conflict with the present disclosure, the present disclosure controls.

I claim:

1. An electric marine propulsion system, comprising an outboard motor lower unit having an aperture;
a stator fixedly positioned within the aperture and having a rotor opening;
a rotor cartridge removably attached to the outboard motor lower unit, the rotor cartridge including:
a rotor carried by a drive shaft and positioned within the rotor opening of the stator;
an output shaft; and
a transmission coupled between the drive shaft and the output shaft, the transmission including:
a transmission housing;
a sun gear carried by the drive shaft;
a ring gear carried by the output shaft;
a planetary gear carrier fixedly attached to the transmission housing;
a carrier bearing positioned between the planetary gear carrier and the output shaft to position the planetary gear carrier and the output shaft concentrically; and
a plurality of planetary gears carried by the planetary gear carrier on corresponding planetary gear shafts;
wherein individual planetary gear shafts are supported relative to the transmission housing on opposing sides of the corresponding planetary gears.

2. The system of claim 1 wherein the stator has a shrink fit interference fit connection with the outboard motor lower housing.

3. The system of claim 1 wherein the output shaft includes a ring gear support carrying the ring gear and positioned radially outwardly from the planetary gear shafts, and an extension portion positioned radially inwardly from the planetary gear shafts and carrying the carrier bearing between an outwardly facing surface of the output shaft and an inwardly facing surface of the carrier.

4. The system of claim 1 wherein an individual planetary gear shaft carries a first planetary gear, fixed to the individual planetary gear shaft and meshed with the sun gear, and a second planetary gear, fixed to the individual planetary gear shaft and meshed with the ring gear.

5. The system of claim 4 wherein the first planetary gear has a first diameter and the second planetary gear has a second diameter less than the first diameter.

6. The system of claim 4 wherein the first and second planetary gears have helical teeth, and wherein the helical teeth of the first and second planetary gears are inclined in the same direction relative to a major axis of the corresponding planetary gear shaft.

7. The system of claim 6 wherein the helical teeth of the first and second planetary gears are inclined by different amounts relative to the major axis of the corresponding planetary gear shaft.

8. The system of claim 1, further comprising no more than two mechanical fasteners connecting the rotor cartridge to the outboard motor lower unit.

9. The system of claim 1 wherein the rotor cartridge is removable from the lower unit as a unitary assembly.

10. The system of claim 1 wherein a gear reduction between the drive shaft and the output shaft is in the range of 4:1 to 10:1.

11. The system of claim 1 wherein a gear reduction between the drive shaft and the output shaft is 7.83:1.

12. The system of claim 1, further comprising a seal sealably positioned between the transmission housing and the output shaft.

13. The system of claim 12 wherein the seal includes:
a seal housing;
a first static face seal carried by the seal housing and having a first sealing surface facing a first direction;
a second static face seal carried by the seal housing and having a second sealing surface facing a second direction opposite the first direction;
a first rotating face seal carried by the output shaft and engaged with the first sealing surface; and
a second rotating face seal carried by the output shaft and engaged with the second sealing surface.

14. An electric marine propulsion system, comprising a rotor cartridge, including:
a rotor carried by a drive shaft;
an output shaft;
a transmission coupled between the drive shaft and the output shaft, the transmission including:
a transmission housing;
a sun gear carried by the drive shaft;
a ring gear carried by the output shaft;
a planetary gear carrier fixedly attached to the transmission housing;
a plurality of planetary gears carried by the planetary gear carrier on corresponding planetary gear shafts;
wherein individual planetary gear shafts are supported on opposing sides of the corresponding planetary gears; and
wherein the carrier is supported by the output shaft; and
at least one mechanical fastener to releasably attach the rotor cartridge, as a unit, to an outboard motor lower unit.

15. The system of claim 14 wherein the at least one mechanical fastener is limited to no more than two mechanical fasteners.

16. The system of claim 14 wherein the carrier is supported by the output shaft via a bearing positioned between an outwardly facing surface of the output shaft and an inwardly facing surface of the planetary gear carrier.

17. The system of claim 14 wherein an individual planetary gear shaft carries a first planetary gear, fixed to the individual planetary gear shaft and meshed with the sun gear, and a second planetary gear, fixed to the individual planetary gear shaft and meshed with the ring gear.

18. The system of claim 17 wherein the first planetary gear has a first diameter and the second planetary gear has a second diameter less than the first diameter.

19. The system of claim 17 wherein the first and second planetary gears have helical teeth, and wherein the helical teeth of the first and second planetary gears are inclined in the same direction relative to a major axis of the corresponding planetary gear shaft.

20. The system of claim 19 wherein the helical teeth of the first and second planetary gears are inclined by different amounts relative to the major axis of the corresponding planetary gear shaft.

21. The system of claim 14, further comprising no more than two mechanical fasteners connecting the rotor cartridge to the outboard motor lower unit.

22. The system of claim 14 wherein the rotor cartridge is removable from the lower unit as a unitary assembly.

23. The system of claim 14 wherein a gear reduction between the drive shaft and the output shaft is in the range of 4:1 to 10:1.

24. The system of claim 14 wherein a gear reduction between the drive shaft and the output shaft is 7.83:1.

25. The system of claim 14, further comprising a seal sealably positioned between the transmission housing and the output shaft.

26. The system of claim 25 wherein the seal assembly includes:
a seal housing;
a first static face seal carried by the seal housing and having a first sealing surface facing a first direction;
a second static face seal carried by the seal housing and having a second sealing surface facing a second direction opposite the first direction;
a first rotating face seal carried by the output shaft and engaged with the first sealing surface; and
a second rotating face seal carried by the output shaft and engaged with the second sealing surface.

27. A method for manufacturing an electric marine propulsion system, comprising:
causing or increasing a temperature difference between an outboard motor lower unit and a stator;
placing the stator in an aperture of the outboard motor lower unit;
causing the temperature difference between the outboard motor lower unit and the stator to decrease, to secure the stator in the aperture;
placing a rotor assembly in the aperture and in a rotor opening of the stator, wherein the rotor assembly includes a transmission, a rotor carried by a drive shaft, and an output shaft coupled to the drive shaft via the transmission; and
connecting the rotor assembly, including the rotor, the drive shaft, the transmission, and the output shaft, as a unit, to the outboard motor lower unit.

28. The method of claim 27 wherein causing or increasing the temperature difference includes heating the outboard motor lower unit, and wherein causing the temperature difference to decrease includes cooling the outboard motor lower unit.

29. The method of claim 28 wherein cooling the outboard motor lower unit includes shrinking the outboard motor lower unit around the stator to form an interference fit between an outer surface of the stator and an inner surface of the aperture of the outboard motor lower unit, and wherein the interference fit is the only securement between the rotor and the outboard motor lower unit.

30. The method of claim 27 wherein causing or increasing the temperature difference includes cooling the stator.

31. A method for manufacturing at least a portion of an electric marine propulsion system, comprising:
assembling a rotor cartridge by coupling a transmission between a rotor shaft and an output shaft;

inserting a rotor carried by the rotor shaft into a stator carried by an outboard motor lower unit, while the rotor shaft, the output shaft and the transmission are assembled to form, at least in part, the rotor cartridge; and releasably connecting the assembled rotor cartridge to the outboard motor lower unit.

32. The method of claim 31 wherein assembling the rotor cartridge includes sealing an interface between the output shaft and a housing of the rotor cartridge, prior to inserting the rotor into the stator.

33. The method of claim 31 wherein releasably connecting the assembled rotor cartridge includes releasably connecting the assembled rotor cartridge with no more than two fasteners.

34. The method of claim 31 wherein the transmission includes a sun gear carried by the drive shaft, a ring gear carried by the output shaft, and a plurality of planetary gears on corresponding planetary gear shafts, and wherein assembling the rotor cartridge includes:

supporting individual planetary gear shafts on opposing sides of the corresponding planetary gears, with a planetary gear carrier; and fixedly attaching the a planetary gear carrier to a housing of the transmission.

35. The method of claim 31 wherein the transmission includes a sun gear carried by the drive shaft, a ring gear carried by the output shaft, and a plurality of planetary gears carried by a planetary gear carrier, and wherein the method further comprises:

concentrically positioning the planetary gear carrier relative to the output shaft via a carrier bearing positioned between the planetary gear carrier and the output shaft.

36. The system of claim 1 wherein the gear shafts include three gear shafts, each carrying a first planetary gear meshed with the sun gear, and a second planetary gear meshed with the ring gear.

* * * * *